May 13, 1924.
M. J. MALLORY
PISTON ROD PACKING
Filed Feb. 2, 1922
1,494,004
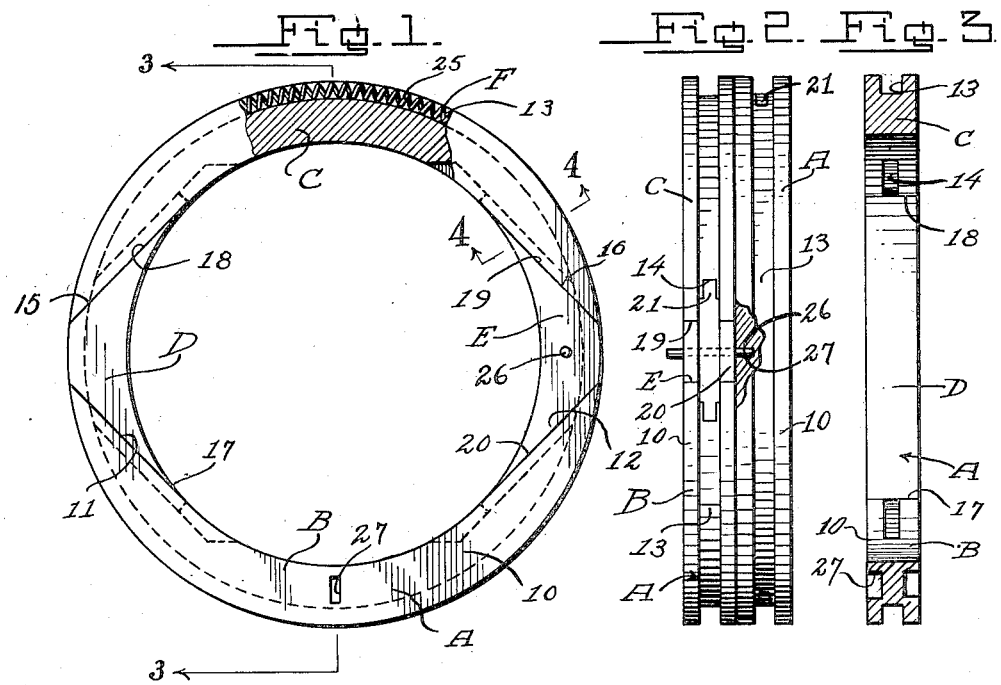
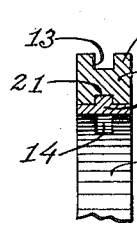
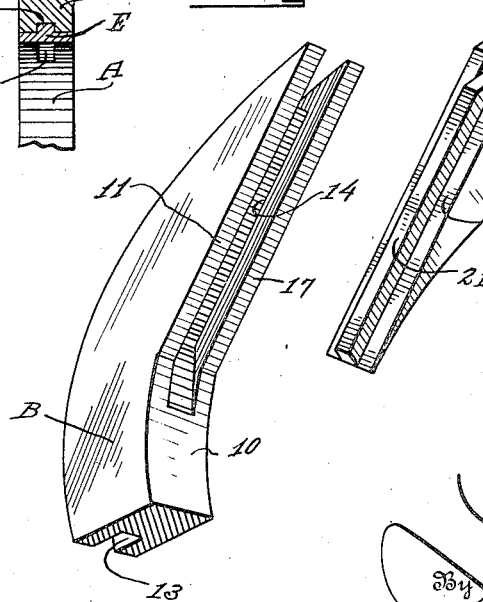
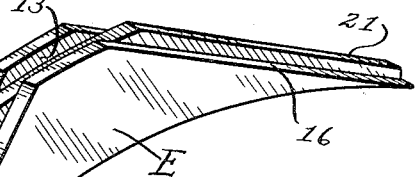
Milton J. Mallory
Inventor
By Lancaster and Allwine
Attorneys Patented May 13, 1924.

1,494,004

UNITED STATES PATENT OFFICE.

MILTON J. MALLORY, OF WALTON, WEST VIRGINIA.

PISTON-ROD PACKING.

Application filed February 2, 1922. Serial No. 533,604.

*To all whom it may concern:*

Be it known that I, MILTON J. MALLORY, a citizen of the United States, residing at Walton, in the county of Roane and State of West Virginia, have invented certain new and useful Improvements in Piston-Rod Packing, of which the following is a specification.

This invention relates to packing rings of the sectional type particularly used for piston rod packing, and the primary object of the invention is to provide a novelly constructed sectional piston rod packing ring in which the sections thereof are so shaped and so associated with one another that an even pressure can be maintained thereon, thereby allowing even wear on the surfaces of said sections, and thus insuring a fluid and vapor tight packing.

Another object of the invention is to provide a sectional piston rod packing ring in which if more or less wear occurs on any particular section or sections through any reason, the other sections will be forced into tighter engagement with the piston rod until even wear on all of the sections is again established, thereby eliminating the necessity of removing the ring and truing the sections thereof by hand.

A further object of the invention is the provision in a sectional piston ring, of novel means for preventing lateral movement of the sections of a ring in relation to one another, thereby preventing displacement of any of the sections through movement of the piston rod.

A further object of the invention is to provide means for connecting two or more of the sectional rings together, so as to hold the same in a predetermined relation to prevent the seeping of fluid and vapor past the joints of the sections.

A still further object of the invention is to provide an improved sectional piston rod packing ring of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more fully described, claimed and illustrated in the accompanying drawings, forming a part of this specification, in which drawings:

Figure 1 is an elevation of one of the improved piston rod packing rings, showing parts thereof in section.

Figure 2 is an edge elevation of a pair of the improved packing rings, partly in section, illustrating the novel means of connecting a pair of the rings together.

Figure 3 is a diametric section taken through one of the rings, on the line 3—3 of Figure 1.

Figure 4 is a fragmentary section through one of the rings, taken on the line 4—4 of Figure 1.

Figure 5 is a fragmentary detail perspective view of one of the sections of the ring.

Figure 6 is a detail perspective view of another one of the sections of the improved ring.

Referring to the drawings in detail, wherein similar reference characters designate corresponding parts throughout the several views, the letter A generally indicates the improved piston rod packing ring, which includes major arcuate sections B and C, and minor arcuate sections D and E, which are held together in their assembled position by resilient means F.

The sections B and C are constructed identically and the sections D and E are disposed between the sections B and C and are also constructed identically.

The major sections B and C each includes an arcuate body portion 10, the ends of which have their inner surfaces cut at an incline of substantially 45° in relation to a diametric line passing through the sections D and E, tangentially to the inner arcuate periphery, providing flat ends 11 and 12. The sections B, C, D, and E are each a segment of a circle and when assembled together form a complete and true circle. The outer faces of all of the sections B, C, D, and E are grooved, as at 13, for the reception of the resilient holding device F, as will be hereinafter more fully described. The flat faces 11 and 12 and adjacent arcuate internal periphery of the sections B and C are also provided with grooves 14 and extending from the external periphery of the sections to a point beyond the juncture of each flat end and arcuate internal periphery, the purpose of which also will be hereinafter more fully described.

The sections D and E are of a substantial wedge shape, and the outer faces thereof at their terminals are inclined to provide flat faces as at 15 and 16, at an angle of substantially 45° to a line passing through the centers of the sections D and E and the center of the ring A and tangentially to the inner arcuate peripheries of these sections D and E. These inclined faces 15 and 16 are adapted to engage the inclined faces 11 and 12 and form sliding joints therewith, which are designated respectively by the numerals 17, 18, 19 and 20. The inclined faces 15 and 16 of the sections D and E are provided with ribs 21, which are adapted to slidably and snugly fit within the grooves 14 formed in the inclined faces 11 and 12 of the sections B and C, the ribs being relatively shorter than the grooves. This means of interconnecting the sections B, C, D, and E allows the sections to slide freely in relation to one another toward the axis of the piston rod, but absolutely precludes lateral movement of the sections in relation to one another longitudinally of the axis of the piston rod. Further, the means of interconnecting the sections forms a fluid and vapor tight joint, as the seeping of fluid past the tongues 21 in the grooves 14 is precluded.

The resilient means F for maintaining the sections in their assembled position and for forcing the sections toward the axis of the piston rod may consist of any preferred tension device, which has been shown by way of example in the drawings, to be an endless coil spring 25. This spring 25 seats in the groove 13 formed around the entire periphery of the ring A. It is obvious that this spring may be substituted by the resilient split ring if so desired.

Now, in use of the improved ring, it can be seen that the spring 25 will maintain even pressure on all of the joints 17, 18, 19 and 20 and serve as means for forcing the sections under even pressure into engagement with the piston rod. The formation of the joints eliminates uneven wear on the bearing faces thereof, which is common in the ordinary type of split or sectional piston ring, and as stated, the seeping of fluid past the joints is practically impossible.

If, through any reason, the piston rod would cause uneven wear on any of the sections, say on the sections B and C, this would cause more pressure on the joints 18 and 19 or on the joints 17 and 20 thereby causing the sections D and E to be forced harder against the piston rod, until the pressure was again equalized on all parts. Any undue wear on the under surface of parts D and E would cause pressure to be relieved from joints 18 and 17 or 19 and 20, thereby causing parts B and C to close down or be brought into more intimate contact with the piston rod, until the pressure was again equalized on all of the sections.

When two or more of the rings A are used together, the same may be connected together by a slot and pin connection, in order that the two rings will be held in a predetermined relation, that is, with like sections out of alignment with each other. As clearly shown in Figures 1 and 2 of the drawings, the section E may be provided with an outstanding pin 26, which is adapted to fit in a radially extending slot 27 formed in the section B of an adjacent ring. This slot and pin connection will allow free movement of the sections of each of the rings toward the axis of the piston rod but will prevent circumferential movement of the two rings in relation to each other around the periphery of the piston rod.

From the foregoing description, it can be seen that an exceptionally simple and durable piston rod packing ring has been provided, in which the sections thereof will always be held in intimate contact with the piston rod under all conditions.

Changes in details may be made without departing from the spirit or scope of this invention; but,

I claim:

A piston rod packing ring comprising a pair of oppositely disposed major arcuate sections and a pair of oppositely disposed minor arcuate sections in end engagement with one another to provide a ring; the major arcuate sections each having flat end portions extending tangentially to its arcuate inner periphery and continuing to its external periphery, and each flat end portion and adjacent arcuate internal periphery provided with a groove extending from the external periphery of the section to a point beyond the juncture of the flat portion and arcuate internal periphery; the minor arcuate sections each having flat end portions extending tangentially to its internal periphery and continuing to its external periphery for engagement with the flat end portion of the adjacent major arcuate section, and said flat end portions of said minor sections each provided with a rib, slidable in the groove of the companion flat end portion of the adjacent major arcuate section, said ribs relatively shorter than said grooves.

MILTON J. MALLORY.